United States Patent
de Borms

(10) Patent No.: US 10,203,423 B2
(45) Date of Patent: Feb. 12, 2019

(54) SYSTEMS AND METHODS FOR GENERATING COMPOSITE NON-LINEAR SWEEPS ADAPTED TO VIBRATOR CONSTRAINTS

(71) Applicant: CGG Services SA, Massy (FR)

(72) Inventor: Brice Tayart de Borms, Paris (FR)

(73) Assignee: CGG SERVICES SAS, Massy (FR)

( * ) Notice: Subject to any disclaimer, the term of this patent is extended or adjusted under 35 U.S.C. 154(b) by 463 days.

(21) Appl. No.: 14/949,214

(22) Filed: Nov. 23, 2015

(65) Prior Publication Data

US 2016/0146954 A1    May 26, 2016

Related U.S. Application Data

(60) Provisional application No. 62/083,423, filed on Nov. 24, 2014.

(51) Int. Cl.
    *G01V 1/00*    (2006.01)
    *G01V 1/133*   (2006.01)

(52) U.S. Cl.
    CPC .............. *G01V 1/005* (2013.01); *G01V 1/133* (2013.01)

(58) Field of Classification Search
    CPC .............................. G01V 1/133; G01V 1/005
    See application file for complete search history.

(56) References Cited

U.S. PATENT DOCUMENTS

| 9,322,941 B2 * | 4/2016 | Meunier ................ G01V 1/143 |
| 2009/0120636 A1 * | 5/2009 | Summerfield ......... G01V 3/083 166/250.16 |
| 2012/0307597 A1 * | 12/2012 | Sallas .................... G01V 1/005 367/189 |

* cited by examiner

*Primary Examiner* — Hovhannes Baghdasaryan
(74) *Attorney, Agent, or Firm* — Patent Portfolio Builders PLLC

(57) ABSTRACT

In accordance with some embodiments of the present disclosure, a method for generating composite non-linear sweeps adapted to vibrator constraints includes determining a target amplitude function, determining a constraint set including a constraint, selecting a scaling constant, calculating a low-frequency non-linear sweep based on the constraint set and the scaling constant, calculating a high-frequency non-linear sweep based on the constraint set, the scaling constant, and the low-frequency non-linear sweep, and calculating a composite non-linear sweep by combining the low-frequency non-linear sweep and the high-frequency non-linear sweep.

20 Claims, 8 Drawing Sheets

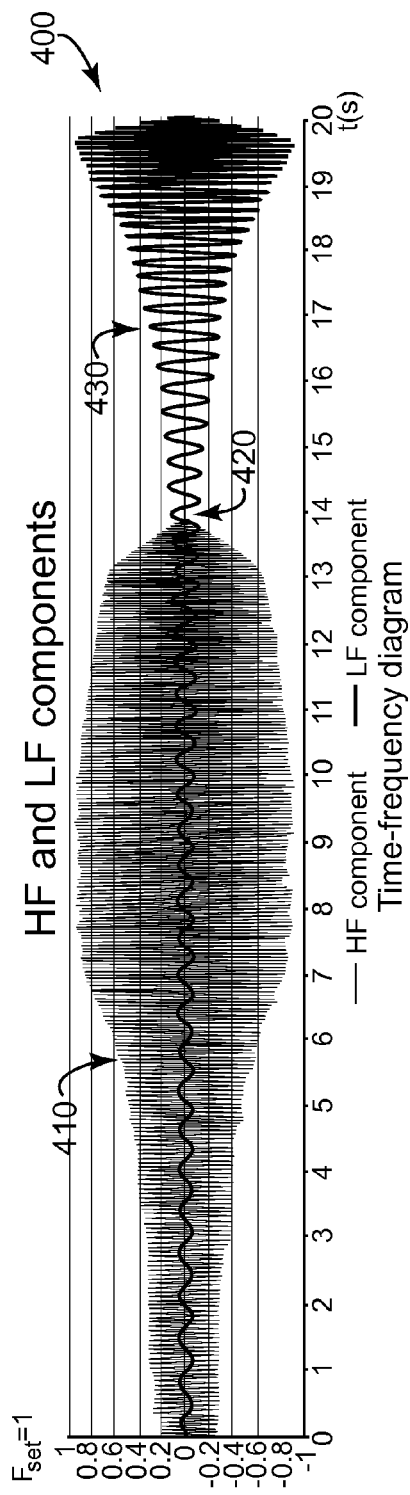
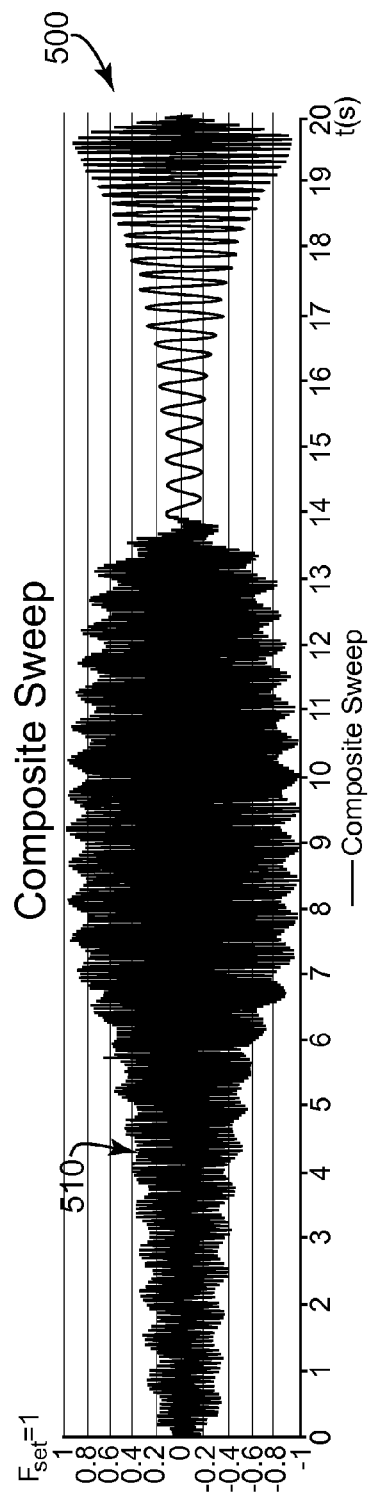

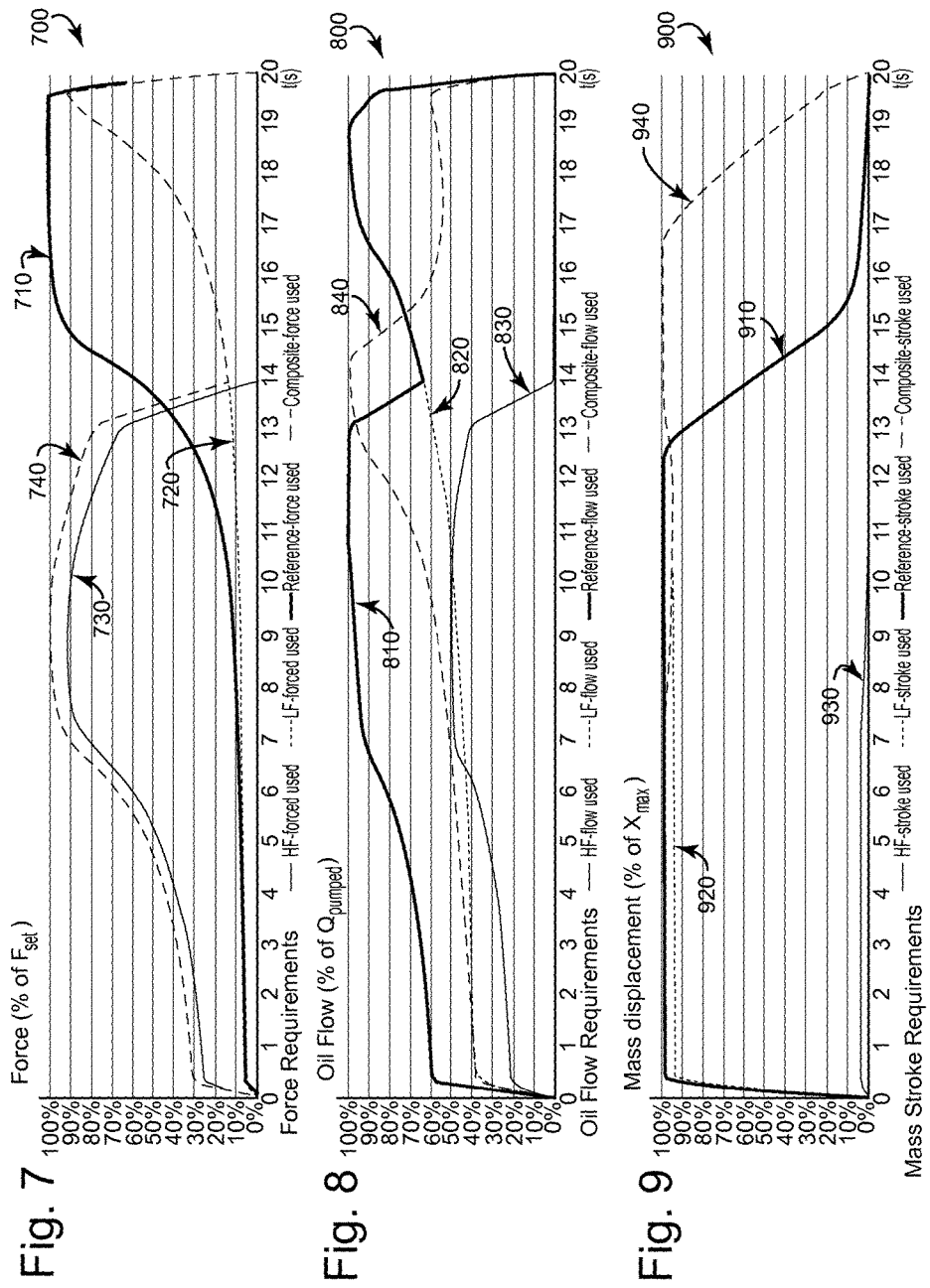

SYSTEMS AND METHODS FOR GENERATING COMPOSITE NON-LINEAR SWEEPS ADAPTED TO VIBRATOR CONSTRAINTS

CROSS-REFERENCE TO RELATED APPLICATION

This application claims the benefit of U.S. Provisional Application Ser. No. 62/083,423 filed on Nov. 24, 2014, which is incorporated by reference in its entirety for all purposes.

TECHNICAL FIELD

The present disclosure relates generally to seismic exploration and, more particularly, to systems and methods for generating composite non-linear sweeps adapted to vibrator constraints.

BACKGROUND

In the oil and gas industry, seismic exploration techniques are commonly used to aid in locating subsurface deposits of oil, gas, and other useful minerals. Because drilling involves high costs and high risks, seismic surveys are used to produce an image of subsurface geological structures. While the image may not directly show the location of oil or gas, those trained in the field can use such images to more accurately predict the location of oil and gas and thus reduce the chance of drilling a non-productive well.

Seismic exploration, whether on land or at sea, is a method of detecting geologic structures below the surface of the earth by analyzing seismic energy that has interacted with the geologic structures. Generally, a seismic energy source imparts a force at the surface of the earth. The resulting mechanical stress propagates according to the elastic properties of the subsurface, and is at least partially reflected by subsurface seismic reflectors (interfaces between geologic structures that have different acoustic impedances). Seismic receivers, placed at or near the earth's surface, within bodies of water, or below the earth's surface in wellbores, record the ground motion or fluid pressure resulting from the reflection. The recordings are processed to generate information about the location and physical properties of the subsurface geologic structures that reflected the seismic energy.

Various types of sources have been employed to impart seismic energy into the earth, but most fall into one of two general categories: impulsive or vibratory. An impulsive source, such as an explosive or airgun, generates a short, high-amplitude force, injecting a large amount of energy into the ground in a brief time. Recordings generated using impulsive sources generally have a high signal-to-noise ratio, which facilitates subsequent processing. However, the use of impulsive sources can present safety or environmental concerns.

By contrast, a vibratory seismic energy source generates a lower-amplitude force over a longer period of time. The resulting recordings generally have a lower signal-to-noise ratio than those generated with impulsive sources. Furthermore, because the imparted force typically extends over a time much longer than the interval between reflections, the recorded data generally contains multiple overlapping reflections. However, subsequent processing can correlate the recorded data with the imparted force to approximate the data that would have been collected using an impulsive source.

Vibratory sources also permit some control over the characteristics of the imparted force. For example, to facilitate data collection, subsequent data processing, or both, it is often desirable to impart a force with energy at one or more desired frequencies, and to vary those frequencies over time. Such a controlled force is typically referred to as a "sweep." The difference between the highest and lowest frequencies contained in the sweep is known as the "frequency range" of the sweep, and the length of time over which the source generates the sweep is known as the "sweep time." Many different forms of sweep may be useful in a seismic survey. For example, a sweep may include a single sinusoid at a fundamental frequency that starts low and varies monotonically upward (an "upsweep") or a fundamental frequency that starts high and varies monotonically downward (a "downsweep"). Such sweeps may be linear, with the fundamental frequency changing at a fixed rate over the entire sweep time. Sweeps may also be non-linear, for example a quadratic or logarithmic sweep. Alternatively, a sweep may include an unvarying fundamental frequency, a mixture of multiple frequencies, an exotic signal such as a pseudo-random sequence, or any other desired signal.

Vibratory sources can take a number of different forms. For example, recent land surveys have often employed servo-controlled hydraulic "shaker units" mounted on trucks. Marine sources typically include a towed bell-shaped housing, with a diaphragm in its open end vibrated by a hydraulic system similar to the land-based shaker units. However, alternative designs have been used, and the term "vibratory source" is intended to encompass any seismic vibrator, whether used on dry land or at sea.

Land-based seismic vibrators typically include several components all carried on a single vehicle. The vehicle may be referred to as a "vibrator truck." The components of the seismic vibrator include a baseplate which is held in contact with the ground, a reaction mass that can move up and down for P-wave vibrators or move back and forth horizontally for S-wave vibrators, a high-pressure hydraulic system that can apply a force between the baseplate and the reaction mass to generate vibrations, and a control system.

These components may impose constraints on the maximum amplitude of the seismic signal that the seismic vibrator can generate at a particular frequency. For example, if the hydraulic system applies too great a force to the reaction mass, the baseplate may lose contact with the ground. As another example, the reaction mass has a limited range of displacement from its neutral position. These constraints correspondingly limit the energy contained in the sweep. As a result, the sweep must be adapted to the constraints imposed by the components of the seismic vibrator.

A sweep containing a single fundamental frequency at a given time may make inefficient use of the vibratory seismic source. For example, a vibratory seismic source may be limited, at low frequencies, by the maximum displacement of the reaction mass. However, at those low frequencies, the force applied by the hydraulic system may be substantially less than the maximum force available. By contrast, at high frequencies, the source may be limited by the maximum force, while the displacement of the reaction mass is significantly smaller than the maximum.

Accordingly, there is a need for systems and methods that can increase the energy contained within a sweep, while still being adapted to the constraints imposed by the components of the seismic vibrator.

SUMMARY

In accordance with one or more embodiments of the present disclosure, a method for generating composite non-linear sweeps adapted to vibrator constraints includes determining a target amplitude function, determining a constraint set including a constraint, selecting a scaling constant, and calculating a low-frequency non-linear sweep based on the constraint set and the scaling constant. The method also includes calculating a high-frequency non-linear sweep based on the constraint set, the scaling constant, and the low-frequency non-linear sweep and calculating a composite non-linear sweep by combining the low-frequency non-linear sweep and the high-frequency non-linear sweep.

In accordance with another embodiment of the present disclosure, a system includes a vibratory seismic energy source and a computing system communicatively coupled to the vibratory seismic energy source. The computing system includes a processor, a memory communicatively coupled to the processor, and instructions stored in the memory. When executed by the processor, the instructions cause the processor to determine a target amplitude function, determine a constraint set including a constraint, select a scaling constant, calculate a low-frequency non-linear sweep based on the constraint set and the scaling constant, calculate a high-frequency non-linear sweep based on the constraint set, the scaling constant, and the low-frequency non-linear sweep, calculate a composite non-linear sweep by combining the low-frequency non-linear sweep and the high-frequency non-linear sweep, and transmit the composite non-linear sweep to the vibratory seismic energy source.

In accordance with another embodiment of the present disclosure, a non-transitory computer-readable medium includes instructions that, when executed by a processor, cause the processor to determine a target amplitude function, determine a constraint set including a constraint, select a scaling constant, calculate a low-frequency non-linear sweep based on the constraint set and the scaling constant, calculate a high-frequency non-linear sweep based on the constraint set, the scaling constant, and the low-frequency non-linear sweep; and calculate a composite non-linear sweep by combining the low-frequency non-linear sweep and the high-frequency non-linear sweep.

BRIEF DESCRIPTION OF THE DRAWINGS

For a more complete understanding of the present disclosure and its features and advantages, reference is now made to the following description, taken in conjunction with the accompanying drawings, which may include drawings that are not to scale and wherein like reference numbers indicate like features, in which:

FIG. 4 illustrates a graph of a sample low-frequency non-linear sweep and a sample high-frequency non-linear sweep in accordance with some embodiments of the present disclosure;

FIG. 5 illustrates a graph of a sample composite non-linear sweep in accordance with some embodiments of the present disclosure;

FIG. 7 illustrates a sample graph of force requirements in accordance with some embodiments of the present disclosure;

FIG. 8 illustrates a sample graph of oil-flow requirements in accordance with some embodiments of the present disclosure;

FIG. 9 illustrates a sample graph of displacement requirements in accordance with some embodiments of the present disclosure;

DETAILED DESCRIPTION

Figure 1:
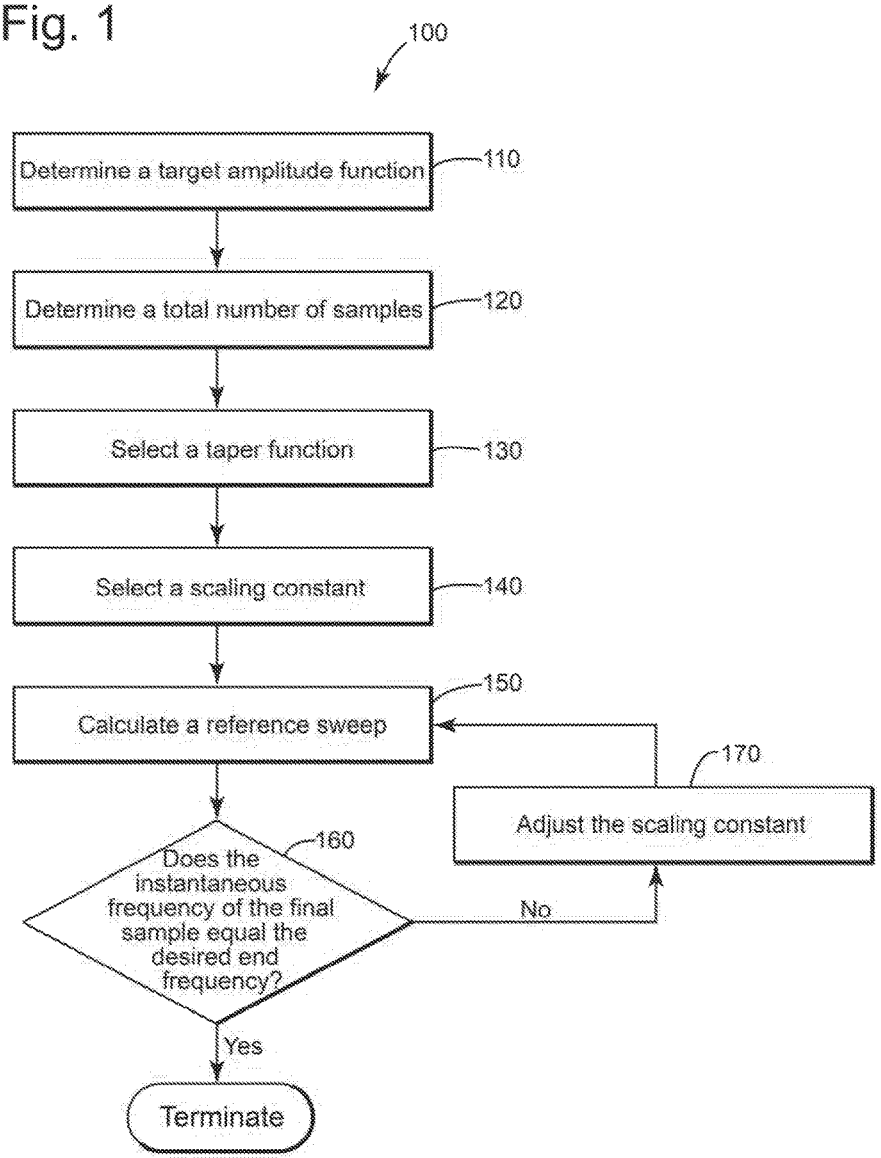
FIG. 1 illustrates a flow chart of an example method for generating a reference sweep in accordance with some embodiments of the present disclosure.

The present disclosure is directed to generation and use of a composite non-linear sweep adapted to the constraints imposed by the components of a seismic vibrator. In general, a composite non-linear sweep contains both a low-frequency non-linear sweep and a high-frequency non-linear sweep that are emitted conjointly. In general, the simultaneous generation of two sweeps limits the maximum amplitude of each sweep. However, because each of these component sweeps is limited by a different constraint, each may be emitted at a large fraction of the maximum amplitude possible if emitted alone. Thus, by emitting the composite sweep, the total emitted energy is increased, improving the use of the seismic vibrator.

To more fully explain the generation and use of a composite non-linear sweep, the present disclosure first describes the components of a seismic vibrator that may give rise to constraints on the amplitude of the seismic signal it emits. Second, the present disclosure describes the constraints those components impose. Third, the present disclosure describes methods of generating a composite non-linear sweep that improves the use of the seismic vibrator while accommodating the constraints. Finally, the present disclosure describes devices and systems that use such composite non-linear sweeps in seismic surveying. Although this disclosure includes certain equations, those skilled in the art will recognize that such equations are simplified for clarity and do not account for non-linearity in the systems described, particularly in descriptions of land-based systems.

As discussed above, land-based seismic vibrators may include several components, including a baseplate that is held in contact with the ground, a reaction mass that can move up and down, a high-pressure hydraulic system that can apply a force between the baseplate and the reaction mass, a control system, and any other suitable components.

The baseplate provides a contact interface with the ground for transmission of the seismic signal generated by the motion of the reaction mass. For example, the base plate may be a plate made of metal or composite material. However, any suitable baseplate may be used. The baseplate may be kept in contact with the ground during operation of the seismic vibrator by applying a "hold down weight" that exceeds the force applied by the hydraulic actuator. The hold-down weight can consist of the weight of the vibrator truck and the other components.

The reaction mass is generally a heavy weight hydraulically coupled to the baseplate and mounted so that it can reciprocate vertically relative to the base plate. The range of vertical motion of the reaction mass may be referred to as the "mass stroke" or the "stroke" of the reaction mass. The center of the stroke may be referred to as the "neutral position" of the reaction mass. The vertical distance from the neutral position to the current position of the reaction mass may be referred to as the "displacement" of the reaction mass. The maximum displacement of the reaction mass, therefore, may be equal to half of the stroke.

The hydraulic system may include a hydraulic pump driven by the vibrator truck's engine. The hydraulic pump provides high-pressure oil to a 4-way servo-valve, which distributes the oil to one of two chambers of a hydraulic actuator connected to the baseplate and the reaction mass. When the servo-valve is in its first position, high-pressure oil is distributed to the lower chamber of the actuator while low-pressure oil is collected from the upper chamber, driving the reaction mass upward relative to the baseplate. At the same time, a downward dynamic force is imparted to the earth through the baseplate contact interface. When the servo-valve is in its second position, oil flows are reversed, the reaction mass moves down and the resultant dynamic contact force is also reversed. Despite the upward forces applied to the baseplate, the baseplate may not break contact with the ground because of the hold-down weight described above. As a result, the motion of the reaction mass is transformed into a seismic signal which is transmitted into the ground through the baseplate.

The control system is designed to cause the seismic vibrator to generate a seismic signal that matches a desired target form known as a "pilot sweep." The control system does so by supplying an electrical "pilot signal" to an electronically-driven pilot valve, which in turn controls the position of the hydraulic system's servo-valve.

The maximum allowable force amplitude at any given frequency, known as $F_{max}(f)$, is limited by several constraints imposed by the components of the seismic vibrator. For example, there is a maximum force that the hydraulic system can output, known as the "hydraulic peak force" or "rated peak force". Also, the force applied to the baseplate may not exceed the hold-down weight or the baseplate will decouple from the ground. In practice, the maximum force applied at any frequency is typically limited to a percentage of these values. For example, the maximum force may be limited to ninety percent of the lowest value between the hydraulic peak force and the hold-down weight. The amplitude of the seismic signal may also be limited by the "peak oil flow rate," which is the maximum flow rate of oil that the hydraulic pump can supply to the hydraulic actuator. The peak oil flow rate places an upper limit on the velocity of the reaction mass with respect to the baseplate. The amplitude of the signal may also be limited by the maximum displacement of the reaction mass.

First, there are two static limits: $F_{max}(f)$ may not exceed the hold-down weight $F_{hd}$, or the baseplate may decouple from the ground, and the force also may not exceed the rated peak force of the vibrator $F_{peak}$. In practice, the operators choose a maximum "drive level" D to preserve some margin below these static constraints. For example, operators may choose a maximum drive level of 95%, so that the vibrator never exceeds 95% of the hold-down weight or the rated peak force of the vibrator. Thus, the static limits may be represented as a single static constraint equal to the product of the chosen maximum drive level and the minimum of the hold-down weight and the rated peak force of the vibrator, according to the following equation:

$$F_{set} = D \cdot \min(F_{hd}, F_{peak}) \quad (1)$$

where
$F_{set}$=the maximum desired force;
D=the drive level;
$F_{hd}$=the hold-down weight; and
$F_{peak}$=the rated peak force of the vibrator.

Second, $F_{max}(f)$ is limited by the oil flow needed to move the reaction mass in the vibrator. The average oil flow required is a function of the force, the frequency, and the characteristics of the vibrator. For example, the oil flow needed to move a reaction mass depends on the area of the vibrator's piston, the reaction mass, the desired force, and the frequency, according to the following equation:

$$Q_m(F, f) = \frac{S}{\pi^2 \cdot m_R} \cdot F \cdot \frac{1}{f} \quad (2)$$

where
$Q_m$=the oil flow needed to move the reaction mass;
F=the force;
S=the cross-sectional area of the actuator piston in the vibrator;
$m_R$=the mass of the reaction mass; and
f=the frequency.

Additional oil flow is required to overcome the compressibility of the hydraulic oil itself. This additional oil flow is a function of the force, the frequency, the volume of oil in the actuator, and the compressibility of that oil, and may be approximated according to the following equation:

$$Q_c(F, f) = \frac{V_0}{S \cdot \beta} \cdot F \cdot f \quad (3)$$

where
$Q_c$=the average oil flow;
F=the force;
$V_0$=the volume of oil in the actuator;
$\beta$=the oil compressibility; and
f=the frequency.

The sum of these two flows must be less than the rated flow rate of the pump in the vibrator, according to the following equation:

$$Q_{avg}(F, f) = F \cdot \left( \frac{S}{\pi^2 \cdot m_R} \cdot \frac{1}{f} + \frac{V_0}{S \cdot \beta} \cdot f \right) < Q_{pump} \quad (4)$$

where
$Q_{avg}$=the average oil flow;
F=the force;

S=the cross-sectional area of the actuator piston in the vibrator;
$m_R$=the mass of the reaction mass;
$V_0$=the volume of oil in the actuator;
$\beta$=the oil compressibility;
f=the frequency; and
$Q_{pump}$=the rated flow rate of the pump.

Equation 4 can be solved for F to provide a single oil-flow constraint on the force as a function of frequency, according to the following equation:

$$F_{oil}(f) = Q_{pump} \cdot \left( \frac{S}{\pi^2 \cdot m_R} \cdot \frac{1}{f} + \frac{V_0}{S \cdot \beta} \cdot f \right)^{-1} \tag{5}$$

where
$Q_{pump}$=the rated flow rate of the pump;
S=the cross-sectional area of the actuator piston in the vibrator;
$m_R$=the mass of the reaction mass;
$V_0$=the volume of oil in the actuator;
$\beta$=the oil compressibility; and
f=the frequency.

In some embodiments, the value of the scaling factor $$\frac{V_0}{S \cdot \beta}$$

may be derived from calibration results available within the vibrator controller. For example, the vibrator controller may be a Sercel VE464 Digital Servo Drive (DSD) that provides calibration results suitable for calculating the scaling factor.

Third, $F_{max}(f)$ may be limited by the peak displacement of the reaction mass from the neutral position, which must not exceed the physical space available for the reaction mass to travel. The peak displacement may be calculated as a function of the desired force and the frequency according to the following equation:

$$X(F, f) = F \cdot \frac{1}{4\pi^2 \cdot m_R} \cdot \frac{1}{f^2} < X_{max} \tag{6}$$

where
X(F,f)=the peak displacement of the reaction mass;
F=the force;
$m_R$=the mass of the reaction mass;
f=the frequency; and
$X_{max}$=the maximum displacement (half of the available stroke of the reaction mass).

Equation 6 can be solved for F to provide a single displacement constraint on the force as a function of frequency, according to the following equation:

$$F_{disp}(f) = X_{max} \cdot 4\pi^2 \cdot m_R \cdot f^2 \tag{7}$$

where
$X_{max}$=the maximum displacement (half of the available stroke of the reaction mass);
$m_R$=the mass of the reaction mass; and
f=the frequency.

Because the force must not exceed any one of the constraints, the maximum allowable force $F_{max}(f)$ may be calculated as the minimum of the static constraint $F_{set}$, the oil-flow constraint $F_{oil}(f)$, and the displacement constraint $F_{disp}(f)$, according to the following equation:

$$F_{max}(f) = \min(F_{set}, F_{oil}(f), F_{disp}(f)) \tag{8}$$

Combining equations 1, 5, and 7 therefore gives the maximum allowable force $F_{max}(f)$, according to the following equation:

$$F_{max}(f) = \min \begin{pmatrix} F_{set}, \\ Q_{pump} \cdot \left( \frac{S}{\pi^2 \cdot m_R} \cdot \frac{1}{f} + \frac{V_0}{S \cdot \beta} \cdot f \right)^{-1}, \\ X_{max} \cdot 4\pi^2 \cdot m_R \cdot f^2 \end{pmatrix} \tag{9}$$

with the various factors defined as above. Equivalently, the maximum allowable force may be given according to the following equation:

$$F_{max}(f) = F_{set} \cdot \min \left( 1, \frac{1}{\frac{f_{flow}}{f} + \frac{f}{f_{comp}}}, \frac{f^2}{f_{stroke}^2} \right) \tag{10}$$

where $F_{set} = D \cdot \min(F_{hd}, F_{peak})$;

$f_{flow} = \frac{F_{set}}{Q_{pump}} \cdot \frac{S}{\pi^2 \cdot m_R}$;

$f_{comp} = \frac{Q_{pump}}{F_{set}} \cdot \frac{S \cdot \beta}{V_0}$;

$f_{stroke} = \frac{1}{2\pi} \cdot \sqrt{\frac{F_{set}}{m_R \cdot X_{max}}}$ ;

and the remaining factors are defined as above.

The static constraint, the oil-flow constraint, or the displacement constraint may predominate in different parts of the frequency spectrum. For example, at low frequencies, the displacement constraint may limit the vibrator, even though the oil flow is significantly below the maximum and the drive level of the vibrator is significantly below the rated peak maximum and the hold-down weight. By contrast, at high frequencies, the hold-down weight may limit the vibrator even though oil flow and displacement are significantly below their respective constraints. At intermediate frequencies, the oil flow may limit the vibrator even though both the drive level of the vibrator and the displacement are significantly below their respective constraints. Furthermore, although the present disclosure discusses the static constraint, the oil-flow constraint, and the displacement constraint, any suitable constraints or sets of constraints may be used.

FIG. 1 illustrates a flow chart of an example method 100 for generating a reference sweep in accordance with some embodiments of the present disclosure. For illustrative purposes, method 100 is described with respect to a land-based seismic vibrator; however, method 100 may be used to generate composite non-linear sweeps for any appropriate seismic signal source. The steps of method 100 can be performed by a user, electronic or optical circuits, various computer programs, models, or any combination thereof, configured to generate pilot signals for a vibratory seismic energy source. The programs and models may include instructions stored on a non-transitory computer-readable medium and operable to perform, when executed, one or more of the steps described below. The computer-readable media can include any system, apparatus, or device configured to store and retrieve programs or instructions such as a hard disk drive, a compact disc, flash memory, or any other suitable device. The programs and models may be configured to direct a processor or other suitable unit to retrieve and execute the instructions from the computer readable media. Collectively, the user, circuits, or computer programs and models used to generate a pilot signal may be referred to as a "processing tool." For example, the processing tool may be the control system for a vibrator truck.

In step 110, the processing tool determines a target amplitude function $A_{tgt}(f)$. The target amplitude function represents the target amplitude of the force at each frequency f. The target amplitude function may be determined based on a particular implementation, the location of the subsurface zone of interest, its elastic response, environmental regulations in the exploration area, the characteristics of the vibratory seismic energy source, projected qualities of the generated force, or any other suitable characteristic. For example, the target amplitude function may be a constant value for all frequencies between a start frequency $f_{start}$ and an end frequency $f_{end}$, and zero outside that range.

In step 120, the processing tool determines a total number of samples N. In some embodiments, the total number of samples will be the product of a sample rate R, which represents the number of samples per second generated by the control system in the vibrator, and a sweep time desired by the designer of the sweep. The total number of samples, sample rate, and sweep time may be determined based on a particular implementation, the location of the subsurface zone of interest, its elastic response, environmental regulations in the exploration area, the characteristics of the vibratory seismic energy source, projected qualities of the generated force, or any other suitable characteristic. For example, the sample rate R may be approximately 2,000 samples per second and the sweep time may be approximately thirty-six seconds. In such an embodiment, the total number of samples may be approximately N=2,000·36=72,000.

In step 130, the processing tool selects a taper function $tap_n$. The taper function is typically chosen to provide a smooth taper at each end of the sample range. For example, the taper function may begin at zero for the first sample, increase linearly to one over the course of approximately $$\frac{R}{2}$$

samples (the first half-second of samples), remain at one through the next approximately N−R samples (until one half-second before the end of the sweep), then decrease linearly to approximately zero. However, any suitable taper function may be used.

In step 140, the processing tool selects a scaling constant C. The scaling constant is used to determine the rate at which the frequency of the reference sweep increases, as described below.

In step 150, the processing tool calculates a reference sweep. The reference sweep includes a set of reference sample values $s_n$. To calculate each sample, the processing tool may calculate an instantaneous phase $\phi_n$, an instantaneous frequency $f_n$, a force amplitude $F_n$ at frequency $f_n$, and a sweep rate $r_n$. For the initial sample, the processing tool may set the instantaneous phase zero and the instantaneous frequency to the start frequency, according to the following equations:

$$\phi_0=0 \qquad (11)$$

$$f_0=f_{start} \qquad (12)$$

The force amplitude of each sample may be set to the maximum allowable force at the instantaneous frequency, according to the following equation:

$$F_n=F(f_n) \qquad (13)$$

The sweep rate of each sample may be chosen to be proportional to the square of the ratio of the force amplitude to the target amplitude, according to the following equation:

$$r_n = C \cdot \left(\frac{F_n}{A_{tgt}(f_n)}\right)^2 \qquad (14)$$

where
C=the scaling constant.
The sweep rate may then be used to calculate the instantaneous phase and frequency of the succeeding sample, according to the following equations:

$$\phi_n = \phi_{n-1} + \frac{2\pi}{R} \cdot \frac{f_n + f_{n-1}}{2} \qquad (15)$$

$$f_n = f_{n-1} + \frac{r_{n-1}}{R} \qquad (16)$$

where
R=the number of samples per second (as described above).
The value of each sample itself may be calculated according to the following equation:

$$s_n=tap_n \cdot F_n \cdot \sin \phi_n \qquad (17)$$

where
$tap_n$=the value of the taper function at sample number n.

In step 160, the processing tool compares the instantaneous frequency of the final sample $F_{N-1}$ to the desired end frequency $f_{end}$. If $F_{N-1}$ is not approximately equal to $f_{end}$, for example within 0.1 Hz, the processing tool proceeds to step 170. If $F_{N-1}$ is approximately equal to $f_{end}$, the method terminates.

In step 170, the processing tool adjusts the scaling constant C. For example, if the processing tool determines in step 160 that $F_{N-1}$ is lower than $f_{end}$, the processing tool may increase the scaling constant. If the processing tool determines in step 160 that $F_{N-1}$ is higher than $f_{end}$, the processing tool may reduce the scaling constant. The processing tool then returns to step 150 to recalculate the samples. Because $F_{N-1}$ is an increasing function of the scaling constant C as discussed above, a dichotomy search will typically find an acceptable value of C within a few iterations.

Modifications, additions, or omissions may be made to method 100 without departing from the scope of the present disclosure. For example, the steps may be performed in a different order than that described and some steps may be performed at the same time. Further, more steps may be added or steps may be removed without departing from the scope of the disclosure.

Figure 2:
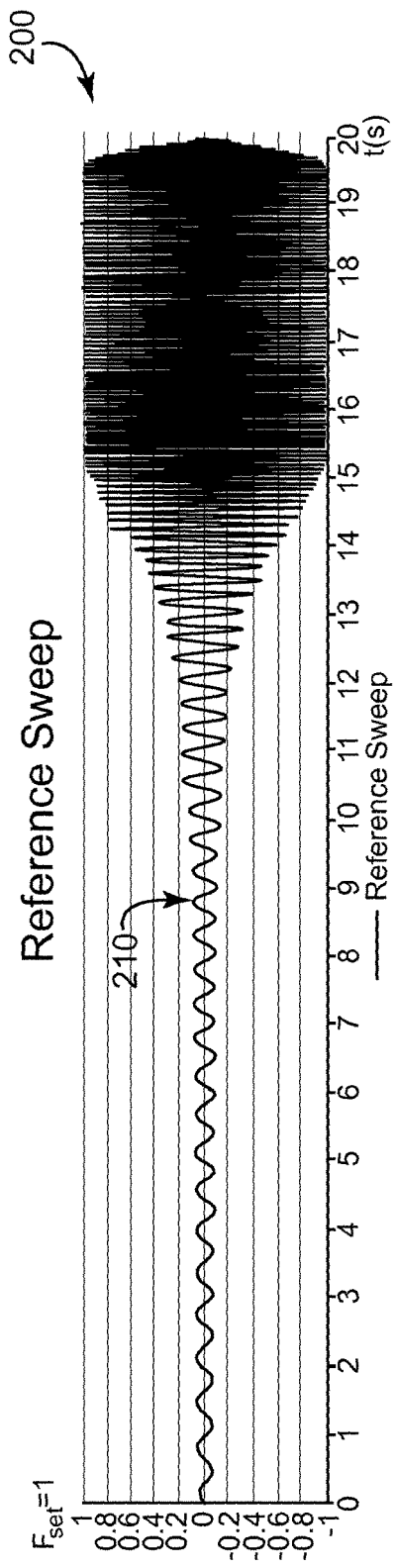
FIG. 2 illustrates a graph of a sample reference sweep in accordance with some embodiments of the present disclosure.

FIG. 2 illustrates a graph 200 of a sample reference sweep in accordance with some embodiments of the present disclosure. Graph 200 represents the sample values $s_n$ of a reference sweep as a function of time, expressed as a fraction of the maximum amplitude. For example, reference sweep 210 begins at a low frequency of approximately 2 Hz and a low amplitude of approximately 5% of the maximum amplitude. The frequency of reference sweep 210 increases continuously across the sweep time. The amplitude of reference sweep 210 increases sharply from approximately time t=12 to approximately time t=15, reaching approximately 100% of its maximum value at approximately time t=16. The amplitude then tapers off to zero between approximately time t=19.5 and approximately time t=20.

The reference sweep produced by method 100 may include an upsweep containing a single fundamental frequency at each sample. It also may be non-linear because the rate of change of the instantaneous frequency varies as a function of the instantaneous frequency. As described above, such a reference sweep may not make efficient use of the seismic vibrator.

In some embodiments, a composite non-linear sweep may make more efficient use of the seismic vibrator because it includes both a high-frequency and a low-frequency signal. A weighting function may be used to limit the force amplitude of a low-frequency signal to slightly less than the full allowable force amplitude during a portion of the sweep. For example, the weighting function may limit the low-frequency signal to approximately 95% of its maximum amplitude at frequencies below approximately 3 hertz (Hz). As a result, during that portion of the sweep, the low-frequency signal may not by itself cause the seismic vibrator to operate at the constraints imposed by any of the components of the seismic vibrator.

During the portion of the sweep when the low-frequency signal is limited by the weighting function, a high-frequency signal may be included in the sweep. In some embodiments, the high-frequency signal is limited by different constraints than is the low-frequency signal. Consequently, the high-frequency signal may also be emitted at only slightly less than the maximum amplitude at which it would be emitted alone.

Figure 3:
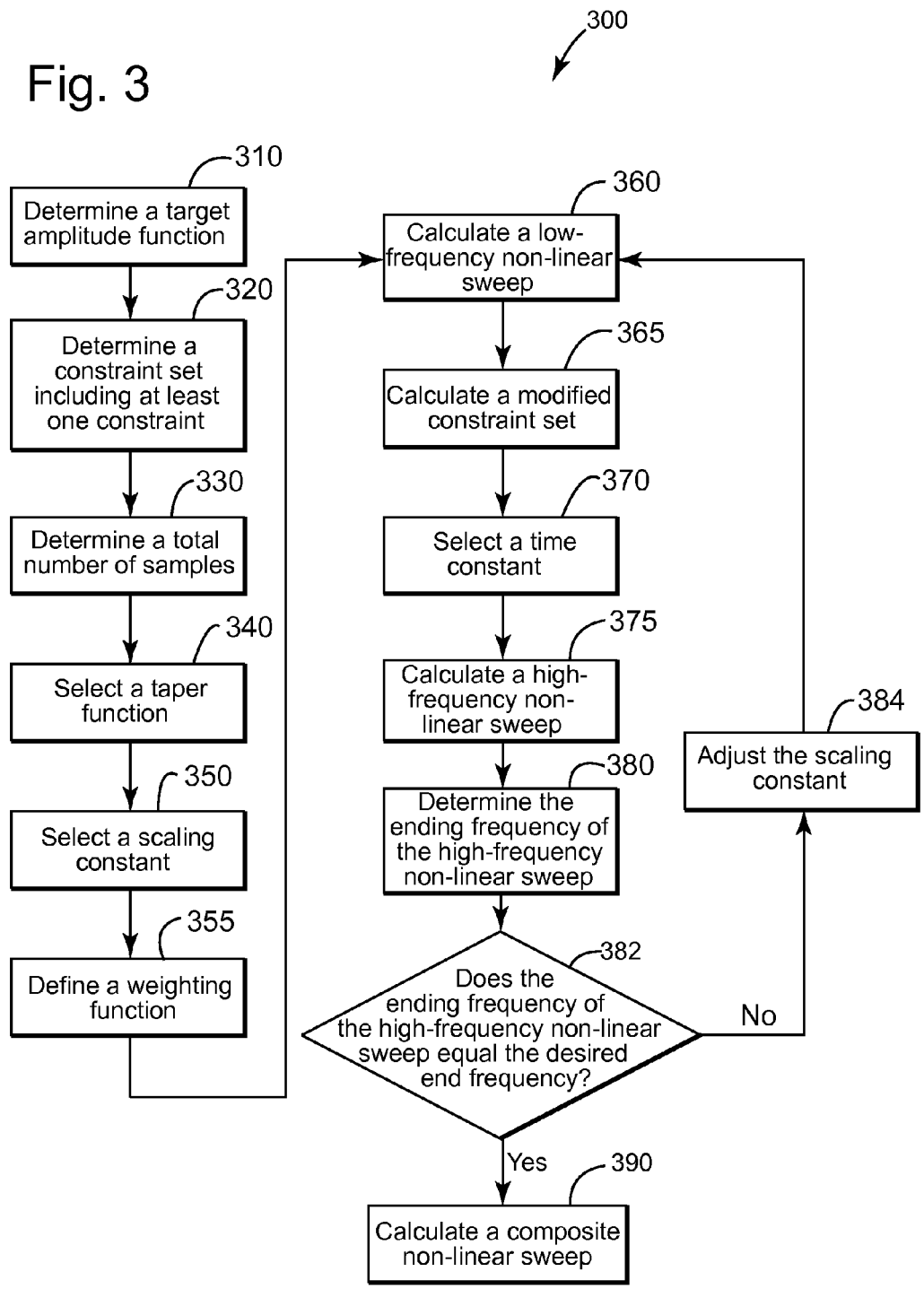
FIG. 3 illustrates a flow chart of an example method for generating a composite non-linear sweep in accordance with some embodiments of the present disclosure.

FIG. 3 illustrates a flow chart of an example method 300 for generating a composite non-linear sweep in accordance with some embodiments of the present disclosure. For illustrative purposes, method 300 is described with respect to a land-based seismic vibrator; however, method 300 may be used to generate composite non-linear sweeps for any appropriate seismic signal source. The steps of method 300 can be performed by a user, electronic or optical circuits, various computer programs, models, or any combination thereof, configured to generate pilot signals for a vibratory seismic energy source. The programs and models may include instructions stored on a non-transitory computer-readable medium and operable to perform, when executed, one or more of the steps described below. The computer-readable media can include any system, apparatus, or device configured to store and retrieve programs or instructions such as a hard disk drive, a compact disc, flash memory, or any other suitable device. The programs and models may be configured to direct a processor or other suitable unit to retrieve and execute the instructions from the computer readable media. Collectively, the user, circuits, or computer programs and models used to generate a pilot signal may be referred to as a "processing tool." For example, the processing tool may be the control system for a vibrator truck.

At step 310, the processing tool determines a target amplitude function $A_{tgt}(f)$. The target amplitude function represents the target amplitude of the force at each frequency f. The target amplitude function may be determined based on a particular implementation, the location of the subsurface zone of interest, its elastic response, environmental regulations in the exploration area, the characteristics of the vibratory seismic energy source, projected qualities of the generated force, or any other suitable characteristic. For example, the target amplitude function may be a constant value for all frequencies between a start frequency $f_{start}$ and an end frequency $f_{end}$, and zero outside that range.

In step 320, the processing tool determines a constraint set including at least one constraint. In some embodiments, the constraint set includes the hold-down constraint imposed by the hold down-weight. In some embodiments, the constraint set includes the rated peak force constraint imposed by the hydraulic system. In some embodiments, the constraint set includes the oil-flow constraint imposed by the hydraulic system. In some embodiments, the constraint set includes the maximum displacement constraint imposed by the stroke of the reaction mass. In some embodiments, the constraint set may include one or more other appropriate constraints. In some embodiments, the constraint set may include a single constraint. In some embodiments, the constraint set may include multiple constraints.

In step 330, the processing tool determines a total number of samples N. In some embodiments, the total number of samples will be the product of a sample rate R, which represents the number of samples per second generated by the control system in the vibrator, and a sweep time desired by the designer of the sweep. The total number of samples, sample rate, and sweep time may be determined based on a particular implementation, the location of the subsurface zone of interest, its elastic response, environmental regulations in the exploration area, the characteristics of the vibratory seismic energy source, projected qualities of the generated force, or any other suitable characteristic. For example, the sample rate R may be approximately 2,000 samples per second and the sweep time may be approximately thirty-six seconds. In such an embodiment, the total number of samples may be approximately N=2,000·36=72,000.

In step 340, the processing tool selects a taper function $tap_n$. The taper function is typically chosen to provide a smooth taper at each end of the sample range. For example, the taper function may begin at zero for the first sample, increase linearly to one over the course of approximately $$\frac{R}{2}$$

samples (the first half-second of samples), remain at one through the next approximately N−R samples (until one half-second before the end of the sweep), then decrease linearly to approximately zero. However, any suitable taper function may be used.

In step 350, the processing tool selects a scaling constant C. The scaling constant is used to determine the rate at which the frequency of the reference sweep increases, as described below.

In step 355, the processing tool defines a weighting function η. The weighting function η may be defined as a function of time or frequency, with values typically in the range of 90-100%. In some embodiments, η may be defined as a function of frequency, with a constant value $A_0$ at any frequency below a specified "taper frequency," a value of one at any frequency above a "cut frequency," and a linear taper in between, according to the following equation:

$$\eta(f) = \begin{cases} A_0, & f \leq f_{taper} \\ A_0 + (1-A_0) \cdot \dfrac{f_{cut}-f}{f_{cut}-f_{taper}}, & f_{taper} < f < f_{cut} \\ 1, & f \geq f_{cut} \end{cases} \quad (18)$$

For example, $\eta$ may have a value of 97% up to 3 Hz and a linear taper to 100% at 3.5 Hz, according to the following equation:

$$\eta(f) = \begin{cases} 0.97, & f \leq 3.0 \text{ Hz} \\ 0.97 + 0.06(f-3), & 3 \text{ Hz} < f < 3.5 \text{ Hz} \\ 1, & f \geq 3.5 \text{ Hz} \end{cases} \quad (19)$$

In some embodiments, $\eta$ may be defined as a function of time, or as a function of the sample number n. Although the present disclosure discusses particular weighting functions, any suitable weighting function may be used.

In step 360, the processing tool calculates a low-frequency non-linear sweep. In some embodiments, the low-frequency nonlinear sweep includes a set of low-frequency sample values $s\_low_n$. To calculate each sample, the processing tool may calculate an instantaneous phase $\phi\_low_n$, an instantaneous frequency $f\_low_n$, a force amplitude $F\_low_n$ at frequency $f\_low_n$, and a sweep rate $r\_low_n$. For the initial sample, the processing tool may set the instantaneous phase zero and the instantaneous frequency to the start frequency, according to the following equations:

$$\phi\_low_0 = 0 \quad (20)$$

$$f\_low_0 = f_{start} \quad (21)$$

The force amplitude of each sample may be set to the product of the weighting function and the maximum allowable force at the instantaneous frequency, given the constraint set. For example, in embodiments in which the weighting function is a function of frequency, the force amplitude may be set according to the following equation:

$$F\_low_n = \eta(f\_low_n) \cdot F(f\_low_n) \quad (22)$$

The sweep rate of each sample may be chosen to be proportional to the square of the ratio of the force amplitude to the target amplitude, according to the following equation:

$$r\_low_n = C \cdot \left(\dfrac{F\_low_n}{A_{tgt}(f\_low_n)}\right)^2 \quad (23)$$

where
C=the scaling constant.
The sweep rate may then be used to calculate the instantaneous phase and frequency of the succeeding sample, according to the following equations:

$$\phi\_low_n = \phi\_low_{n-1} + \dfrac{2\pi}{R} \cdot \dfrac{f\_low_n + f\_low_{n-1}}{2} \quad (24)$$

$$f\_low_n = f\_low_{n-1} + \dfrac{r\_low_{n-1}}{R} \quad (25)$$

where
R=the number of samples per second (as described above).
The value of each sample itself may be calculated according to the following equation:

$$s\_low_n = tap_n \cdot F\_low_n \cdot \sin \phi\_low_n \quad (26)$$

where
$tap_n$=the value of the taper function at sample number n.
Although the present disclosure discusses a particular method of generating a low-frequency non-linear sweep, any suitable method of generating a low-frequency non-linear sweep is intended to be encompassed within the present disclosure.

In step 365, the processing tool calculates a modified constraint set based on the constraint set and the low-frequency non-linear sweep. For example, during portions of the sweep in which the weighting function is less than one, the low-frequency non-linear sweep may not consume all of the force, oil-flow, or stroke available from the seismic vibrator. Thus, the remaining available force, oil flow, and displacement may be calculated at each sample n according to the following equations:

$$F\_avail_n = F_{set} - F\_low_n \quad (27)$$

$$Q\_avail_n = Q_{pump} - Q(F\_low_n, f\_low_n) \quad (28)$$

$$X\_avail_n = X_{max} - X(F\_low_n, f\_low_n) \quad (29)$$

where
$F\_avail_n$=the remaining available force;
$Q\_avail_n$=the remaining available oil flow;
$X\_avail_n$=the remaining available displacement;
and the remaining factors are defined as above.

In step 370, the processing tool selects a time constant $\Delta T$. The time constant is used to determine the amount of overlap between the high-frequency and low-frequency non-linear sweeps, as described below.

In step 375, the processing tool calculates a high-frequency non-linear sweep. In some embodiments, the high-frequency non-linear sweep includes a set of high-frequency sample values $s\_high_n$. To calculate each sample, the processing tool may calculate an instantaneous phase $\phi\_high_n$, an instantaneous frequency $f\_high_n$, a force amplitude $F\_high_n$ at frequency $f\_high_n$, and a sweep rate $r\_high_n$. For the initial sample, the processing tool may set the instantaneous phase to zero, according to the following equation:

$$\phi\_high_0 = 0 \quad (30)$$

For the initial sample, the processing tool may set the instantaneous frequency equal to the instantaneous frequency that the low-frequency non-linear sweep reached at a time $\Delta T$ prior to its end, according to the following equations:

$$f\_high_0 = f\_low_{(N-1)-\Delta T \cdot R} \quad (31)$$

The force amplitude of each sample may be set to the maximum allowable force at the instantaneous frequency, given the modified constraint set. For example, in embodiments in which the constraints include the static constraints, the oil-flow constraint, and the displacement constraints, the processing tool may set the force amplitude to the maximum force allowable to the high-frequency signal at the time of any sample, according to the following equations:

$$F\_Q_n = Q\_avail_n \cdot \left(\dfrac{S}{\pi^2 \cdot m_R} \cdot \dfrac{1}{f\_high_n} \cdot \dfrac{V_0}{S \cdot \beta} \cdot f\_high_n\right)^{-1} \quad (32)$$

$$F\_X_n = X\_high_n \cdot 4\pi^2 \cdot m_R \cdot f\_high_n^2 \quad (33)$$

$$F\_high_n = \min(F\_avail_n, F\_Q_n, F\_X_n) \quad (34)$$

The sweep rate of each sample may be chosen to be proportional to the square of the ratio of the force amplitude to the target amplitude, according to the following equation:

$$r\_high_n = C \cdot \left( \frac{F\_high_n}{A_{tgt}(f\_high_n)} \right)^2 \quad (35)$$

where
C=the scaling constant.
The sweep rate may then be used to calculate the instantaneous phase and frequency of the succeeding sample, according to the following equations:

$$\phi\_high_n = \phi\_high_{n-1} + \frac{2\pi}{R} \cdot \frac{f\_high_n + f\_high_{n-1}}{2} \quad (36)$$

$$f\_high_n = f\_high_{n-1} + \frac{r\_high_{n-1}}{R} \quad (37)$$

where
R=the number of samples per second (as described above).
The value of each sample itself may be calculated according to the following equation:

$$s\_high_n = tap_n \cdot F\_high_n \cdot \sin \phi\_high_n \quad (38)$$

where
$tap_n$=the value of the taper function at sample number n.
Although the present disclosure discusses a particular method of generating a high-frequency non-linear sweep, any suitable method of generating a high-frequency non-linear sweep is intended to be encompassed within the present disclosure.

In step 380, the processing tool determines the ending frequency of the high-frequency non-linear sweep. In some embodiments, the ending frequency of the high-frequency non-linear sweep will correspond to the instantaneous frequency of the final sample of the high-frequency non-linear sweep. In some embodiments, the ending frequency will correspond to the instantaneous frequency of an earlier sample. For example, in embodiments including the weighting function described above in connection with step 355, the processing tool may determine the sample number $n_{cut}$ at which the low-frequency non-linear sweep reaches $f_{cut}$ and consequently the weighting function becomes equal to one. Because the low-frequency non-linear sweep consumes the maximum available force beyond that point, the amplitude of the high-frequency non-linear sweep will be zero. Thus, the ending frequency of the high-frequency non-linear sweep will correspond to the instantaneous frequency of sample $n_{cut}$.

In step 382, the processing tool compares the ending frequency of the high-frequency non-linear sweep to the desired end frequency $f_{end}$. If the ending frequency of the high-frequency non-linear sweep is not approximately equal to the $f_{end}$, the processing tool proceeds to step 384. If the ending frequency of the high-frequency non-linear sweep is approximately equal to $f_{end}$, the processing tool proceeds to step 390.

In step 384, the processing tool adjusts the scaling constant C. For example, if the processing tool determines in step 382 that the ending frequency of the high-frequency non-linear sweep is lower than the desired ending frequency, the processing tool may increase the scaling constant. If the processing tool determines in step 382 that the ending frequency of the high-frequency non-linear sweep is higher than the desired ending frequency, the processing tool may reduce the scaling constant. The processing tool then returns to step 360 to regenerate the low-frequency and high-frequency non-linear sweeps.

In step 390, the processing tool generates a composite non-linear sweep by combining the low-frequency non-linear sweep and the high-frequency non-linear sweep. In some embodiments, the composite non-linear sweep is a linear superposition of the low-frequency non-linear sweep and the high-frequency non-linear sweep. For example, the processing tool may create a composite non-linear sweep by summing the low-frequency non-linear sweep and the high-frequency non-linear sweep according to the following equation:

$$s\_comp_n = s\_low_n + s\_high_n \quad (39)$$

However, any appropriate method of combining the low-frequency non-linear sweep and the high-frequency non-linear sweep is intended to be encompassed within the present disclosure.

Modifications, additions, or omissions may be made to method 300 without departing from the scope of the present disclosure. For example, the steps may be performed in a different order than that described and some steps may be performed at the same time. Further, more steps may be added or steps may be removed without departing from the scope of the disclosure.

FIG. 4 illustrates a graph 400 of a sample low-frequency non-linear sweep and a sample high-frequency non-linear sweep in accordance with some embodiments of the present disclosure. Graph 400 represents the sample values of the sweeps as a function of time, expressed as a fraction of the maximum amplitude. For example, high-frequency non-linear sweep 410 represents the sample values $s\_high_n$. High-frequency non-linear sweep 410 goes to zero at point 420, when low-frequency non-linear sweep 430 reaches the cut-off frequency $f_{cut}$. Low-frequency non-linear sweep 430 represents the sample values $s\_low_n$.

FIG. 5 illustrates a graph 500 of a sample composite non-linear sweep in accordance with some embodiments of the present disclosure. Graph 500 represents the sample values of the composite non-linear sweep generated by combining high-frequency non-linear sweep 410 and low-frequency non-linear sweep 430, discussed in connection with FIG. 4, as a function of time, expressed as a fraction of the maximum amplitude. For example, composite non-linear sweep 510 represents the sample values $s\_comp_n$.

Figure 6:
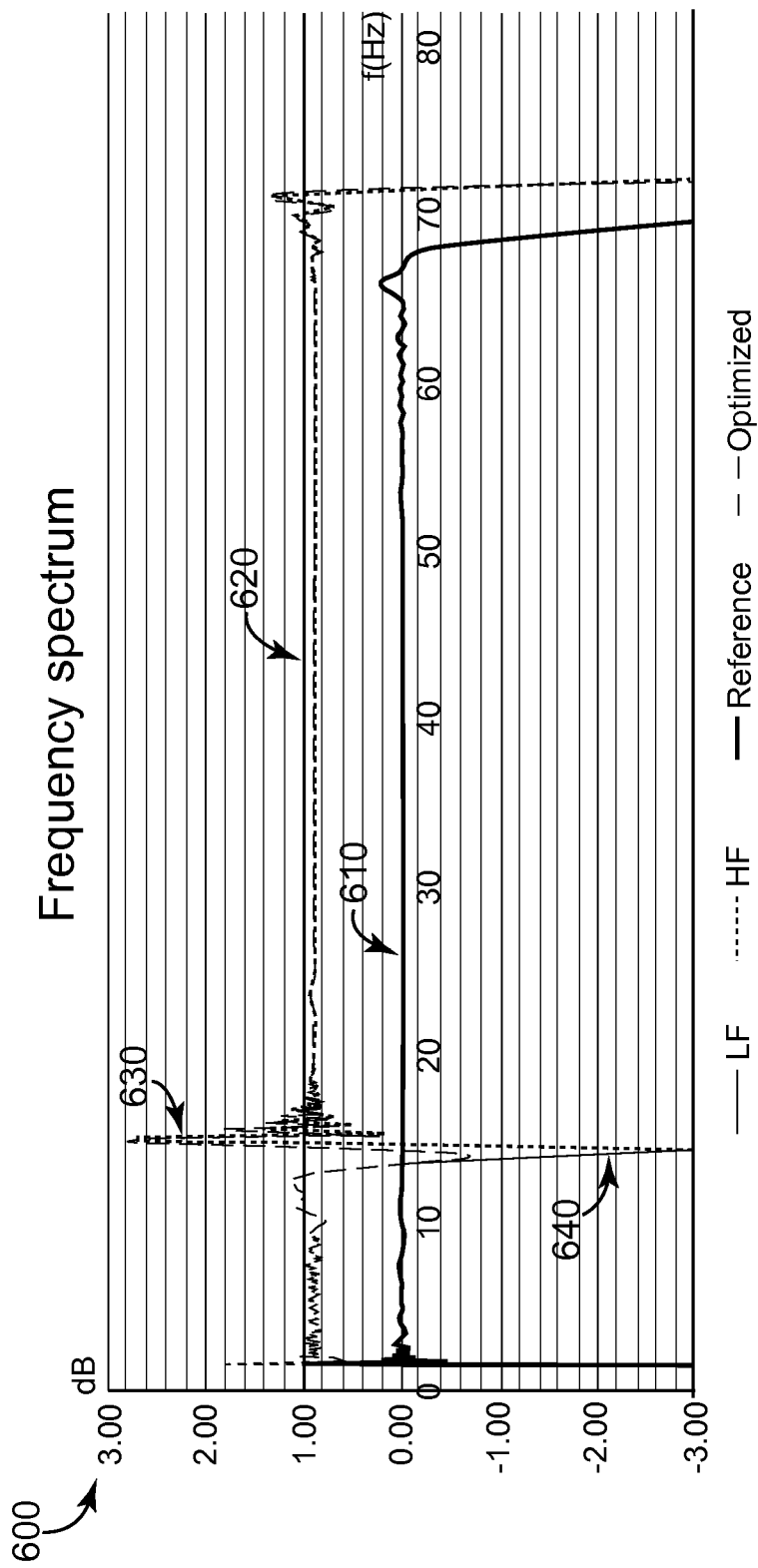
FIG. 6 illustrates a graph of the frequency spectra of a sample reference sweep and a sample composite non-linear sweep, in accordance with some embodiments of the present disclosure.

FIG. 6 illustrates a graph 600 of the frequency spectra of a sample reference sweep and a sample composite non-linear sweep, in accordance with some embodiments of the present disclosure. Graph 600 represents the power spectrum of the sweeps as a function of frequency, expressed in decibels (dB) relative to the average power of the reference sweep. For example, spectrum 610 corresponds to a reference sweep. Spectrum 610 hovers close to approximately 0 dB over most of its range. Spectrum 620 corresponds to a composite non-linear sweep generated with the same input parameters as the reference sweep. Spectrum 620 hovers close to approximately +0.95 dB over most of its range, showing a significant gain in power relative to the reference sweep. Spectrum 630 corresponds to the high-frequency non-linear sweep used to generate the composite non-linear sweep. Spectrum 640 corresponds to the low-frequency non-linear sweep used to generate the composite non-linear sweep.

FIG. 7 illustrates a sample graph of force requirements in accordance with some embodiments of the present disclosure. Graph 700 represents the percentage of $F_{set}$—the maximum force permitted by the hold-down weight, the rated peak force of the vibrator, and the drive level selected by the operator—consumed by each of the sweeps as a function of time. For example, reference sweep 710 consumes approximately 5% of $F_{set}$ at approximately time t=1, but rises sharply at approximately time t=14 and consumes approximately 100% of F_set at approximately time t=19, shortly before the reference sweep tapers off. Low-frequency non-linear sweep 720 also consumes approximately 5% of $F_{set}$ at approximately time t=1, but rises more slowly than the reference sweep and consumes only approximately 85% of $F_{set}$ at approximately time t=19. High-frequency non-linear sweep 730 consumes approximately 25% of $F_{set}$ at approximately time t=1, but rises to consume approximately 90% of $F_{set}$ at approximately time t=9 before dropping to approximately zero at approximately time t=14. Composite non-linear sweep 740 is the sum of low-frequency non-linear sweep 720 and high-frequency non-linear sweep 730. It consumes approximately 100% of $F_{set}$ at approximately time t=9.

FIG. 8 illustrates a sample graph of oil-flow requirements in accordance with some embodiments of the present disclosure. Graph 800 represents the percentage of the available oil flow consumed by each of the sweeps as a function of time. For example, reference sweep 810 consumes approximately 40% of available oil flow at approximately time t=1, and rises gradually to consume approximately 100% of available oil flow at approximately time t=14.5 before dropping to approximately 60% at approximately time t=19, shortly before the reference sweep tapers off. Low-frequency non-linear sweep 820 consumes approximately 37% of available oil flow at approximately time t=1, but rises more slowly than the reference sweep and consumes approximately 100% of available oil flow at approximately time t=19. High-frequency non-linear sweep 830 consumes approximately 20% of available oil flow at approximately time t=1, and rises to consume approximately 45% of available oil flow at approximately time t=9 before dropping to zero at approximately time t=14. Composite non-linear sweep 840 is the sum of low-frequency non-linear sweep 820 and high-frequency non-linear sweep 830. It consumes approximately 100% of available oil flow at approximately time t=13 and again at approximately time t=19.

FIG. 9 illustrates a sample graph 900 of displacement requirements in accordance with some embodiments of the present disclosure. Graph 900 represents the percentage of the available displacement consumed by each of the sweeps as a function of time. For example, reference sweep 910 consumes approximately 100% of available displacement from approximately time t=1 to approximately time t=12.5, then drops rapidly toward approximately zero. Low-frequency non-linear sweep 920 consumes approximately 95% of available displacement at approximately time t=1, but rises after approximately time t=13 to approximately 100% of available displacement at approximately time t=14, then drops rapidly toward approximately zero after approximately time t=17. High-frequency non-linear sweep 930 consumes less than approximately 5% of displacement from approximately time t=1 to approximately time t=7 and drops to approximately zero at approximately time t=14. Composite non-linear sweep 940 is the sum of low-frequency non-linear sweep 920 and high-frequency non-linear sweep 930. It consumes between approximately 95% and approximately 100% of available displacement across the entire graph.

In some embodiments, an iterative adjustment may be performed on the two parameters $f_{cut}$ and $A_0$ to reduce the scaling constant C. Because the amplitude of the emitted signal is inversely proportional to the scaling constant C, a lower value of C results in a higher amplitude of the emitted signal. In some embodiments, the time constant $\Delta T$ may also be adjusted to avoid any large gap or peak in the final frequency spectrum.

Figure 10:
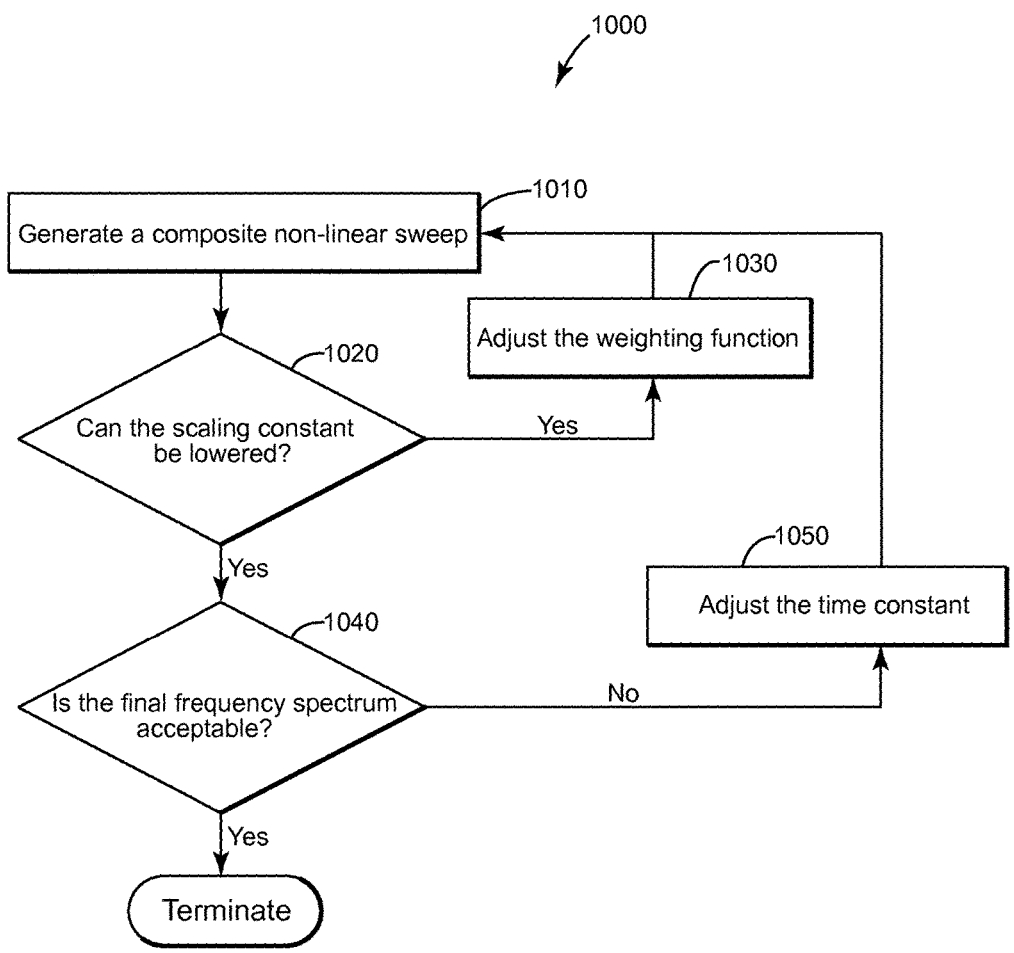
FIG. 10 illustrates a flow chart of an example method for adjusting the constants used to generate a composite non-linear sweep in accordance with some embodiments of the present disclosure.

FIG. 10 illustrates a flow chart of an example method 1000 for adjusting the constants used to generate a composite non-linear sweep in accordance with some embodiments of the present disclosure. For illustrative purposes, method 1000 is described with respect to a land-based seismic vibrator; however, method 1000 may be used to generate composite non-linear sweeps for any appropriate seismic signal source. The steps of method 1000 can be performed by a user, electronic or optical circuits, various computer programs, models, or any combination thereof, configured to generate pilot signals for a vibratory seismic energy source. The programs and models may include instructions stored on a non-transitory computer-readable medium and operable to perform, when executed, one or more of the steps described below. The computer-readable media can include any system, apparatus, or device configured to store and retrieve programs or instructions such as a hard disk drive, a compact disc, flash memory, or any other suitable device. The programs and models may be configured to direct a processor or other suitable unit to retrieve and execute the instructions from the computer readable media. Collectively, the user, circuits, or computer programs and models used to generate a pilot signal may be referred to as a "processing tool." For example, the processing tool may be the control system for a vibrator truck.

At step 1010, the processing tool generates a composite non-linear sweep. For example, the processing tool may employ method 300, described above with reference to FIG. 3.

In step 1020, the processing tool determines whether the scaling constant C used to generate the composite non-linear sweep is at a minimum. For example, the processing tool may use a hill climbing algorithm, a simulated annealing algorithm, or another non-linear optimization algorithm to test whether alterations to the weighting function would lower the resulting value of C. However, any suitable algorithm for testing whether C is at a minimum may be used. If the processing tool determines that the value of C is not at a minimum, the processing tool proceeds to step 1030. If the processing tool determines that C is at a minimum, the processing tool proceeds to step 1040.

In step 1030, the processing tool adjusts the weighting function. In some embodiments, the processing tool adjusts the values of $f_{cut}$ and $A_0$ used to define the weighting function in step 355 of method 300, discussed in connection with FIG. 3. For example, the processing tool may use a hill climbing algorithm or a simulated annealing algorithm to choose new values of $f_{cut}$ and $A_0$ likely to lead to a lower value of C. However, any suitable algorithm for seeking values of $f_{cut}$ and $A_0$ that may minimize C may be used. The processing tool then returns to step 1010 to generate a new composite linear sweep. As a result of the altered values of $f_{cut}$ and $A_0$, the next iteration of step 1010 will use a different weighting function η, and a different value of C will result.

In step 1040, the processing tool determines whether the final frequency spectrum is acceptable. In embodiments in which ΔT is positive, both the low-frequency non-linear sweep and the high-frequency non-linear sweep may contain samples corresponding to the same range of frequencies. Because both sweeps are contributing energy within that range of frequencies, the frequency spectrum of the composite sweep may contain a peak or trough within that range of frequencies. In some embodiments, the processing tool may accept only spectra in which the peak or trough is within a specified percentage of the desired energy. For example, the processing tool may accept only spectra in which the peak or trough is within 1% of the desired energy. If the processing tool determines that the final frequency spectrum is acceptable, method 1000 terminates. If the processing tool determines that the final frequency spectrum is unacceptable, the processing tool proceeds to step 1050.

In step 1050, the processing tool adjusts the value of ΔT. For example, if the processing tool determined in step 1040 that the final frequency spectrum contained an unacceptably large peak, the processing tool may decrease ΔT. If the processing tool determined in step 1040 that the final frequency spectrum contained an unacceptably large trough, the processing tool may increase ΔT. The processing tool then returns to step 1010.

Figure 11:
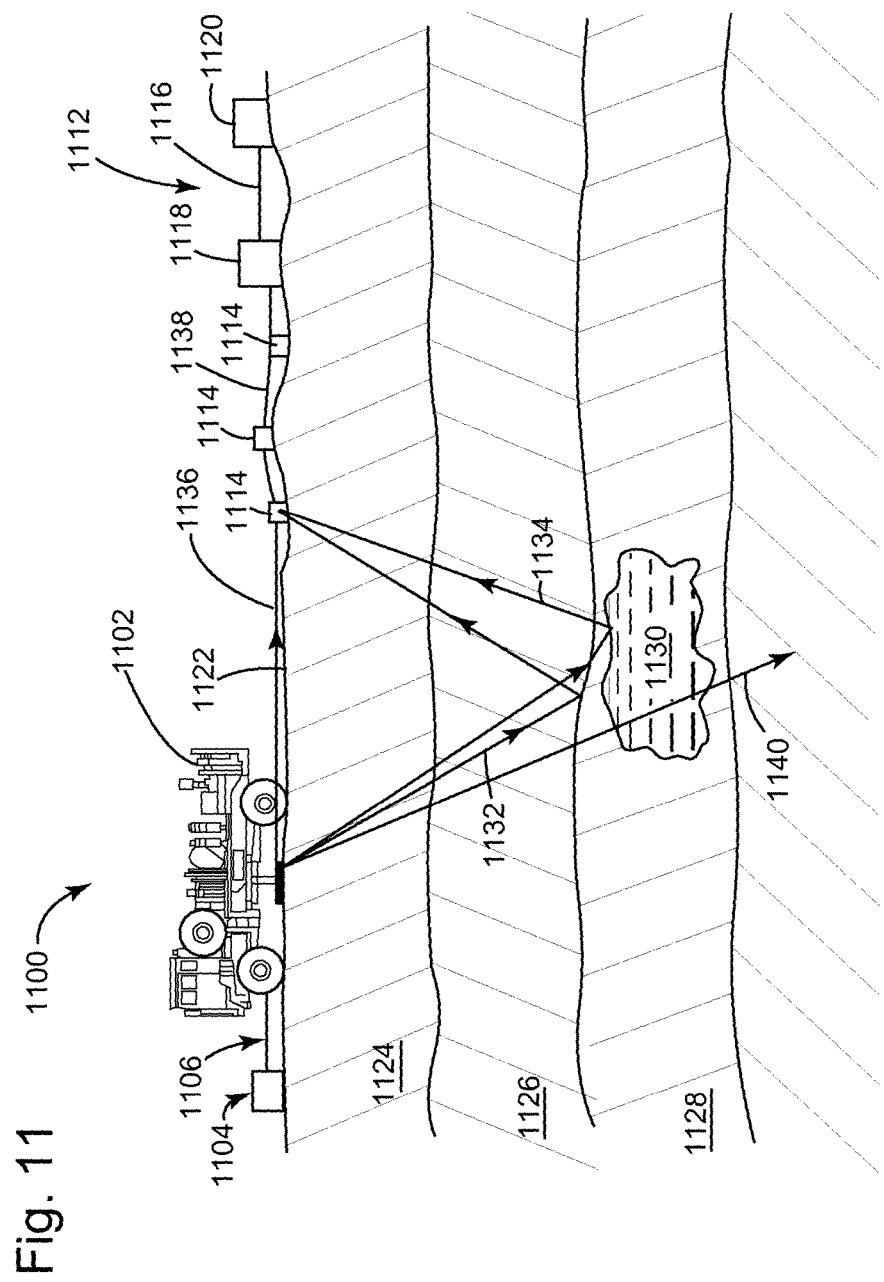
FIG. 11 illustrates an elevation view of an example seismic exploration system 1100 configured to use a seismic energy source to produce images of the earth's subsurface geological structure in accordance with some embodiments of the present disclosure.

FIG. 11 illustrates an elevation view of an example seismic exploration system 1100 configured to use a composite non-linear sweep to drive a seismic energy source to produce images of the earth's subsurface geological structure in accordance with some embodiments of the present disclosure. The images produced by system 1100 allow for the evaluation of subsurface geology. Seismic data is acquired and processed to produce images of subsurface formations. System 1100 includes one or more seismic energy sources 1102 and one or more receivers 1114 which are located within a pre-determined area selected for seismic survey or exploration. Survey of the exploration area includes the activation of seismic energy source 1102 that applies a force which in turn generates elastic waves that propagate through the earth. The seismic energy is then partially reflected, refracted, diffracted, and otherwise returned by one or more subsurface formations such as rock layers beneath the earth's surface, producing a motion recorded by receivers 1114.

System 1100 includes one or more seismic energy sources 1102. In some embodiments, source 1102 is located on or proximate to surface 1122 of the earth within an exploration area. A particular source 1102 may be spaced apart from other adjacent sources 1102. Further, a positioning system, such as a global positioning system (GPS), may be utilized to locate sources 1102 and receivers 1114 and time-stamp their recordings.

Source 1102 is any type of seismic device that generates controlled seismic energy used to perform reflection or refraction seismic surveys, such as a land-based or marine seismic vibrator, or any other suitable seismic energy source. For example, source 1102 may be a vibroseis truck.

In some embodiments, controller unit 1104 directs the operation of source 1102 by transmitting a pilot signal to source 1102 via network 1106. For example, controller unit 1104 may generate a composite non-linear sweep in accordance with method 100 or method 300 and transmit it to source 1102. Although discussed separately, source 1102 and controller unit 1104 may be configured as separate units or as a single unit. Controller unit 1104 may include any instrumentality or aggregation of instrumentalities operable to compute, classify, process, transmit, receive, store, display, record, or utilize any form of information, intelligence, or data. For example, controller unit 1104 may include one or more personal computers, storage devices, servers, or any other suitable device and may vary in size, shape, performance, functionality, and price. Controller unit 1104 may include random access memory (RAM), one or more processing resources, such as a central processing unit (CPU) or hardware or software control logic, or other types of volatile or non-volatile memory. Additional components of controller unit 1104 may include one or more disk drives, one or more network ports for communicating with external devices, one or more input/output (I/O) devices, such as a keyboard, a mouse, or a video display. Controller unit 1104 may be configured to permit communication over any type of network 106, such as a wireless network, a local area network (LAN), or a wide area network (WAN) such as the Internet. Furthermore, controller unit 1104 may be located in a station truck or any other suitable enclosure, or mounted on the same vehicle as that carrying source 1102. In some embodiments, controller unit 1104 is a central controller that coordinates the operation of multiple sources 1102.

In response to the pilot signal, source 1102 radiates seismic energy into surface 1122 and subsurface formations during a defined interval of time. The seismic energy may comprise any suitable type of sweep, and may or may not contain undesired noise energy. For example, in some embodiments source 1102 radiates generated force 452 in response to pilot signal 402.

In some embodiments, the force generated by source 1102 is detected and recorded at or proximate to source 1102 by monitoring device 1112, receiver 1114, by measurement devices incorporated into source 1102 itself, or by any other suitable system. For example, the force may be measured by a near-field measurement device or by combining one or more measured motions of one or more actuating parts of the source, as discussed above.

Seismic exploration system 1100 includes one or more monitoring devices 112 that operate to record reflected seismic energy 1132, 1134, and 1136. In some embodiments, monitoring device 1112 includes one or more receivers 1114, network 1116, recording unit 1118, and processing unit 1120. Monitoring device 1112 may be located remotely from source 1102.

In some embodiments, receiver 1114 is located on or proximate to surface 1122 of the earth within an exploration area. Receiver 1114 is any type of instrument that is operable to transform seismic energy or vibrations into a voltage signal. Receiver 1114 detects movements from elastic waves or other seismic energy below surface 1122 and converts the motions into electrical energy, such as electric voltages. For example, receiver 1114 may be a geophone configured to detect and record seismic energy reflected from subsurface formations. Receiver 1114 may be a vertical, horizontal, or multicomponent geophone. For example, receiver 1114 may include a three component (3C) geophone, a 3C accelerometer, a 3C Digital Sensor Unit (DSU), a fiber-optic sensor, a distributed acoustic sensor (DAS), or hydrophones. In some embodiments, multiple receivers 1114 are utilized within an exploration area to provide data related to multiple locations and distances from sources 1102. For example, system 1100 may utilize two hundred receivers (or geophones) 1114. Receivers 1114 may be positioned in multiple configurations, such as linear, grid, array, or any other suitable configuration. In some embodiments, receivers 1114 are positioned along one or more strings 138. Each receiver 1114 is typically spaced apart from adjacent receivers 1114 in the string 138. Spacing between receivers 1114 in string 138 may be approximately the same preselected distance, or span, or the spacing may vary depending on a particular application, exploration area topology, or any other suitable parameter. For example, spacing between receivers 1114 may be approximately ten meters.

In some embodiments, one or more receivers 1114 transmit raw seismic data from reflected seismic energy via network 1116 to recording unit 1118. Recording unit 118 transmits raw seismic data to processing unit 1120 via network 1116. Processing unit 1120 performs seismic data processing on the raw seismic data to prepare the data for interpretation. Although discussed separately, recording unit 1118, processing unit 1120, and controller unit 1104 may be configured as separate units or as a single unit.

Network 1116 communicatively couples one or more components of monitoring device 1112 with any other component of monitoring device 1112. For example, network 1116 communicatively couples receivers 1114 with recording unit 1118 and processing unit 1120. Furthermore, network 1138 communicatively couples a particular receiver 1114 with other receivers 1114. Although discussed separately, network 1116, network 1138, and network 1106 may be configured as separate networks or as a single network. Network 1116, network 1138, and network 1106 may be any type of network that provides communication. For example, network 1116 may include one or more of a wireless network, a local area network (LAN), or a wide area network (WAN), such as the Internet.

In some embodiments, sources 1102 are controlled to generate energy and receivers 1114 record seismic energy traveling along paths 1132 and 1134 and reflected by interfaces between subsurface layers 1124, 1126, and 1128, oil and gas reservoirs, such as target reservoir 1130, or other subsurface formations. Subsurface layers 1124, 1126, and 1128 may have various densities, thicknesses, or other characteristics. Target reservoir 1130 may be separated from surface 1122 by multiple layers 1124, 1126, and 1128. Because the embodiment depicted in FIG. 11 is exemplary only, there may be more or fewer layers 1124, 1126, or 1128 or target reservoirs 1130.

The seismic survey may be repeated at various time intervals to determine changes in target reservoir 1130. The time intervals may be months or years apart. Data may be collected and organized based on offset distances, such as the distance between a particular source 1102 and a particular receiver 1114 and the amount of time it takes for seismic energy traveling along paths 1132 and 1134 from a source 1104 to a particular receiver 1114. The amount of time seismic energy takes to reach a receiver is known as the travel time. Data collected during a survey by receivers 1114 is reflected in traces that may be gathered, processed, and utilized to generate a model of the subsurface formations.

Although discussed with reference to a land implementation, embodiments of the present disclosure are also useful in marine applications. In a marine application, monitoring device 1112 may include hydrophones (or other receivers known in the art) contained inside towed streamers, which may be towed behind a vessel, or nodes or cable positioned on the sea floor. Seismic energy source 1102 and monitoring device 1112 may be towed behind the same or a different vessel.

In a marine application, seismic energy source 1102 may include an electric marine vibrator. In such applications, the constraints imposed on seismic energy source 1102 may differ from those in a land-based system. For example, an electric marine vibrator does not require a hold-down weight to keep the vibrator in contact with a solid surface, as does a land-based system. As a result, the loading of an electric marine vibrator is nearly constant from shot to shot, and such a system is more linear than a land-based system. The constraints imposed on seismic energy source 1102 in a marine application may include the stroke of the vibrator, the maximum current supplied to the vibrator, and the voltage applied to the vibrator. In addition, in a marine application, the far field pressure may be directly related to the acceleration of the piston in an electric marine vibrator. As a result, rather than controlling the force applied by a baseplate, the system may control the stroke of the vibrator directly. One of skill in the art would recognize that aspects of a piston in an electric marine vibrator could be substituted for the force in the equations described in this disclosure.

In some marine applications, seismic energy source 1102 may include a high frequency unit and a low frequency unit. In such applications, the high frequency unit and the low frequency unit may operate simultaneously to generate a composite nonlinear sweep. The pressure generated at a distance from seismic energy source 1102, for example in the far field, may be directly related to the sum of the pressure generated by the high-frequency unit and the pressure generated by the low-frequency unit. For example, the high frequency unit may generate high-frequency non-linear sweep 410, discussed with reference to FIG. 4. The low-frequency unit may generate low-frequency non-linear sweep 430. Thus, the unit as a whole may generate composite non-linear sweep 510, discussed with reference to FIG. 5, in the far field.

Any of the steps, operations, or processes described herein may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability. For example, the computing system described in methods 100 and 300 with respect to FIGS. 1 and 3 may be stored in tangible computer readable storage media.

Although the present disclosure has been described with several embodiments, changes, variations, alterations, transformations, and modifications may be suggested to one skilled in the art, and it is intended that the present disclosure encompass such changes, variations, alterations, transformations, and modifications as fall within the scope of the appended claims. Moreover, while the present disclosure has been described with respect to various embodiments, it is fully expected that the teachings of the present disclosure may be combined in a single embodiment as appropriate. Instead, the scope of the disclosure is defined by the appended claims.

What is claimed is:

1. A method for seismic exploration using composite non-linear sweeps adapted to vibrator constraints, the method comprising:
   determining a target amplitude function;
   determining a constraint set including a constraint;
   selecting a scaling constant used to determine a rate of frequency increase;
   calculating a low-frequency non-linear sweep based on the constraint set and the scaling constant;
   calculating a modified constraint set based on the constrained set and the low-frequency non-linear sweep;
   calculating a high-frequency non-linear sweep based on the modified constraint set, the scaling constant, and the low-frequency non-linear sweep;
   calculating a composite non-linear sweep by combining the low-frequency non-linear sweep and the high-frequency non-linear sweep; and
   operating a vibratory seismic source according to the composite non-linear sweep to inject seismic excitations in an explored subsurface geological structure.

2. The method of claim 1, further comprising defining a weighting function,
   wherein calculating the low-frequency non-linear sweep comprises:
   determining a maximum allowable force amplitude at a low frequency based on the constraint set; and
   calculating a low-frequency force amplitude at the low frequency by multiplying the value of the weighting function at the low frequency by the maximum allowable force amplitude at the low frequency.

3. The method of claim 1, wherein the calculating of the high-frequency non-linear sweep comprises:
   determining a modified maximum allowable force amplitude at a high frequency based on the modified constraint set; and
   calculating a high-frequency force amplitude at the high frequency based on the modified maximum allowable force amplitude at the high-frequency.

4. The method of claim 1, further comprising:
   determining an ending frequency of the high-frequency non-linear sweep;
   comparing the ending frequency of the high-frequency non-linear sweep to a desired ending frequency;
   in response to determining that the ending frequency of the high-frequency non-linear sweep differs from the desired ending frequency, adjusting the scaling constant; and
   repeating the steps of calculating the low-frequency non-linear sweep and calculating the high-frequency non-linear sweep.

5. The method of claim 1, further comprising:
   selecting a weighting function, wherein the low-frequency non-linear sweep is further based on the weighting function;
   determining whether the scaling constant can be lowered;
   in response to determining that the scaling constant can be lowered, adjusting the weighting function;
   selecting a time constant;
   determining whether a final frequency spectrum is acceptable;
   in response to determining that the final frequency spectrum is not acceptable, adjusting the time constant; and
   repeating the steps of calculating the low-frequency non-linear sweep and calculating the high-frequency non-linear sweep.

6. The method of claim 1 wherein the at least one constraint is selected from the group consisting of a hold-down constraint, a rated peak force constraint, an oil-flow constraint, or a maximum displacement constraint.

7. The method of claim 1, further comprising using the composite non-linear sweep in a seismic survey.

8. A system comprising:
   a vibratory seismic energy source;
   a computing system communicatively coupled to the vibratory seismic energy source, the computing system comprising:
   a processor;
   a memory communicatively coupled to the processor;
   instructions stored in the memory that, when executed by the processor, cause the processor to:
   determine a target amplitude function;
   determine a constraint set including a constraint;
   select a scaling constant used to determine a rate of frequency increase;
   calculate a low-frequency non-linear sweep based on the constraint set and the scaling constant;
   calculate a modified constraint set based on the constrained set and the low-frequency non-linear sweep;
   calculate a high-frequency non-linear sweep based on the modified constraint set, the scaling constant, and the low-frequency non-linear sweep;
   calculate a composite non-linear sweep by combining the low-frequency non-linear sweep and the high-frequency non-linear sweep; and
   transmit the composite non-linear sweep to the vibratory seismic energy source.

9. The system of claim 8, the instructions, when executed by the processor, further causing the processor to define a weighting function,
   wherein causing the processor to calculate the low-frequency non-linear sweep comprises causing the processor to:
   determine a maximum allowable force amplitude at a low frequency based on the constraint set; and
   calculate a low-frequency force amplitude at the low frequency by multiplying the value of the weighting function at the low frequency by the maximum allowable force amplitude at the low frequency.

10. The system of claim 8, the instructions, when executed by the processor, further cause the processor to calculate, the high-frequency non-linear sweep by:
    determining a modified maximum allowable force amplitude at a high frequency based on the modified constraint set; and
    calculating a high-frequency force amplitude at the high frequency based on the modified maximum allowable force amplitude at the high-frequency.

11. The system of claim 8, the instructions, when executed by the processor, further causing the processor to:
    determine an ending frequency of the high-frequency non-linear sweep;
    compare the ending frequency of the high-frequency non-linear sweep to a desired ending frequency;
    in response to determining that the ending frequency of the high-frequency non-linear sweep differs from the desired ending frequency, adjust the scaling constant; and
    repeat the steps of calculating the low-frequency non-linear sweep and calculating the high-frequency non-linear sweep.

12. The system of claim 8, the instructions, when executed by the processor, further causing the processor to:

select a weighting function, wherein the low-frequency non-linear sweep is further based on the weighting function;
determine whether the scaling constant can be lowered;
in response to determining that the scaling constant can be lowered, adjust the weighting function;
select a time constant;
determine whether a final frequency spectrum is acceptable;
in response to determining that the final frequency spectrum is not acceptable, adjust the time constant; and
repeat the steps of calculating the low-frequency non-linear sweep and calculating the high-frequency non-linear sweep.

13. The system of claim 8 wherein the at least one constraint is selected from the group consisting of a hold-down constraint, a rated peak force constraint, an oil-flow constraint, or a maximum displacement constraint.

14. The system of claim 8, the instructions, when executed by the processor, further causing the processor to create an image based on the composite non-linear sweep.

15. A non-transitory computer-readable medium, comprising instructions that, when executed by a processor, cause the processor to:
determine a target amplitude function;
determine a constraint set including a constraint;
select a scaling constant used to determine a rate of frequency increase;
calculate a low-frequency non-linear sweep based on the constraint set and the scaling constant;
calculate a modified constraint set based on the constrained set and the low-frequency non-linear sweep;
calculate a high-frequency non-linear sweep based on the modified constraint set, the scaling constant, and the low-frequency non-linear sweep;
calculate a composite non-linear sweep by combining the low-frequency non-linear sweep and the high-frequency non-linear sweep; and
transmitting the composite non-linear sweep to a seismic source that generates seismic excitations injected in an explored subsurface geological structure accordingly.

16. The non-transitory computer-readable medium of claim 15, the instructions, when executed by the processor, further causing the processor to define a weighting function, wherein causing the processor to calculate the low-frequency non-linear sweep comprises causing the processor to:
determine a maximum allowable force amplitude at a low frequency based on the constraint set; and
calculate a low-frequency force amplitude at the low frequency by multiplying the value of the weighting function at the low frequency by the maximum allowable force amplitude at the low frequency.

17. The non-transitory computer-readable medium of claim 15, the instructions, when executed by the processor, wherein causing the processor to generate the high-frequency non-linear sweep comprises causing the processor to:
determine a modified maximum allowable force amplitude at a high frequency based on the modified constraint set; and
calculate a high-frequency force amplitude at the high frequency based on the modified maximum allowable force amplitude at the high-frequency.

18. The non-transitory computer-readable medium of claim 15, the instructions, when executed by the processor, further causing the processor to:
determine an ending frequency of the high-frequency non-linear sweep;
compare the ending frequency of the high-frequency non-linear sweep to a desired ending frequency;
in response to determining that the ending frequency of the high-frequency non-linear sweep differs from the desired ending frequency, adjust the scaling constant; and
repeat the steps of calculating the low-frequency non-linear sweep and calculating the high-frequency non-linear sweep.

19. The non-transitory computer-readable medium of claim 15, the instructions, when executed by the processor, further causing the processor to:
select a weighting function, wherein the low-frequency non-linear sweep is further based on the weighting function;
determine whether the scaling constant can be lowered;
in response to determining that the scaling constant can be lowered, adjust the weighting function;
select a time constant;
determine whether a final frequency spectrum is acceptable;
in response to determining that the final frequency spectrum is not acceptable, adjust the time constant; and
repeat the steps of calculating the low-frequency non-linear sweep and calculating the high-frequency non-linear sweep.

20. The non-transitory computer-readable medium of claim 15 wherein the at least one constraint is selected from the group consisting of a hold-down constraint, a rated peak force constraint, an oil-flow constraint, or a maximum displacement constraint.

* * * * *